United States Patent
Orlogi et al.

(10) Patent No.: US 7,589,985 B2
(45) Date of Patent: Sep. 15, 2009

(54) SWITCHING REGULATOR

(75) Inventors: Helmuth Orlogi, Regensburg (DE); Reinhart Weber, Regensburg (DE)

(73) Assignee: Siemens Aktiengesellshaft, Munich (DE)

( * ) Notice: Subject to any disclaimer, the term of this patent is extended or adjusted under 35 U.S.C. 154(b) by 232 days.

(21) Appl. No.: 11/630,877

(22) PCT Filed: Jun. 23, 2005

(86) PCT No.: PCT/EP2005/052945
§ 371 (c)(1),
(2), (4) Date: Dec. 26, 2006

(87) PCT Pub. No.: WO2006/000569
PCT Pub. Date: May 1, 2006

(65) Prior Publication Data
US 2008/0030180 A1 Feb. 7, 2008

(30) Foreign Application Priority Data
Jun. 25, 2004 (DE) ....................... 10 2004 030 840

(51) Int. Cl.
*H02M 3/24* (2006.01)
(52) U.S. Cl. ..................... 363/97; 363/21.09; 323/234; 323/285
(58) Field of Classification Search ......... 323/282–290, 323/222, 234, 224; 307/64–66; 363/16, 363/95, 97, 131
See application file for complete search history.

(56) References Cited

U.S. PATENT DOCUMENTS

| | | | |
|---|---|---|---|
| 5,508,603 A | 4/1996 | Strong, III | |
| 5,530,636 A | 6/1996 | Brown | |
| 5,781,000 A | 7/1998 | Saeki et al. | |
| 7,489,118 B2 | 2/2009 | Fujii | |
| 2006/0273767 A1 | 12/2006 | Fujii | |

FOREIGN PATENT DOCUMENTS

| | | |
|---|---|---|
| JP | 2003219636 A | 7/2003 |
| JP | 2003235250 A | 8/2003 |

OTHER PUBLICATIONS

Japanese Office Action dated May 13, 2009.

*Primary Examiner*—Rajnikant B Patel
(74) *Attorney, Agent, or Firm*—Laurence A. Greenberg; Werner H. Stemer; Ralph E. Locher

(57) ABSTRACT

A switching regulator is configured as a fixed-voltage regulator and contains a voltage divider. The voltage divider is supplied with a voltage signal available from a regulator output via a first connection. The voltage divider feds an output signal to the driver circuit functioning as a regulating variable that is compared to a reference voltage. The switching regulator further contains a monitoring device which impinges the driver circuit with a voltage signal exceeding the reference voltage as a new regulating variable depending on the voltage signal applied to the first connection.

9 Claims, 2 Drawing Sheets

SWITCHING REGULATOR

BACKGROUND OF THE INVENTION

Field of the Invention

The invention relates to a switching regulator (1) embodied as a fixed voltage regulator with a voltage divider (40), to which a voltage signal present at the regulator output (2) can be fed via a first terminal (V), to feed to a driver circuit (35, 31) an output signal of the voltage divider (40) as regulating variable which is evaluated with a reference voltage (Vref).

Switching regulators are used in the automotive field for example to regulate and actuate a passenger protection system, such as an airbag. They are frequently embodied in the form of an integrated circuit provided with a housing, as a so-called ASIC (Application Specific Integrated Circuit) in which as a rule at least the energy accumulator elements of the switching regulator are embodied as external components for reasons of cost. In order to establish the necessary electrical connections, the energy accumulator elements and the ASIC will for example be arranged on an appropriately embodied circuit board. Switching regulators can either be step-up regulators or step-down regulators.

The layout of a generic switching regulator 1 is described below with reference to FIG. 1.

The switching regulator 1 shown in the Figure has a circuit arrangement 30, of which the components are arranged in an integrated circuit—with the above-mentioned ASIC—and are connected to external components of the switching regulator 1 (reference symbol 10). The switching regulator 1 is embodied as a step-up regulator and features a diode 11 connected between a node 3 and a reference potential. Unlike in the layout depicted in the diagram, the diode 11 also be embodied as an integrated component in the ASIC. A charge accumulator 13 is connected between a regulator output 2 and the reference potential. A coil 12 is connected in series between the node 3 and the regulator output 2.

The node 3 is connected to an output terminal Sout of the circuit arrangement 30. Between the output terminal Sout and a supply potential terminal Vin is connected an output driver 31 of the circuit arrangement, which in the simplest case involves a controllable semiconductor switch. The output driver 31 is controlled by an operational amplifier circuit 35, which on the input side at an input 37 has a reference signal applied to it and at an input 38 a regulation signal. The regulation signal is obtained from a voltage present at a regulation output 2 and is fed to the circuit arrangement 30 via an internal voltage divider 40 connected to a first terminal V. For this purpose a center tap 43 of the voltage divider consisting of two resistors 41, 42 connected in series is linked to the input 38.

Because of the fixed and non-variable voltage ratio at the voltage divider a circuit arrangement is created which only allows the output of a rated voltage at the regulator output 2. Since different loads able to be connected to the regulator output 2 operate with different rated voltages, an option is provided in the circuit arrangement 30 which allows another freely-selectable rated voltage to be obtained at the regulator output.

To this end the circuit arrangement 30 features a second terminal FB which can be connected to a further, external voltage divider 20. The voltage divider 20 is connected between the regulator output 2 and the reference potential terminal. In this case the second terminal FB is connected to the center tap 23 of the voltage divider 20 which typically consists of two resistors 21, 22 connected in series.

The additional provision of a switchover means 47, on application of a signal to a terminal SEL, allows either the internal voltage divider 40 or the external voltage divider 20 to be connected to the operational amplifier circuit 35. The switchover means 47 has two circuit elements 44, 45 for this purpose, which with their one terminal are each connected to the input 38 of the operational amplifier circuit 35 and with their other input in each case are connected to the center tap 43 or 23 of the internal or external voltage divider 40 or 20. The switches are controlled by applying a signal to the terminal SEL, with an inverted signal (inverter 46) to the signal present at terminal SEL being fed to the switching element 45.

Above and beyond this the circuit arrangement 30 features a voltage monitoring circuit 39, which is connected between the terminal V and the control input 32 of the output driver 31. The voltage monitoring circuit 39 monitors the voltage present at the regulator output 2 and switches the output driver off if the regulator output voltage is too high, in order to prevent a malfunction of the load connected to the regulator output. To this end the voltage monitoring circuit 39 features a comparator circuit, with the regulator output voltage on the one hand and reference voltage Vref on the other hand being fed to the comparator.

As already mentioned at the start, the ASIC circuit arrangement 30 is present in the form of an integrated circuit arranged in a housing. When the module is connected to a circuit board incorrect connections can also occur so that the correct function of the switching regulator 1 is not ensured.

If, because of an incorrect connection, the voltage present at the regulator output 2 is not applied to the first terminal V, the regulation loop formed with the internal voltage divider cannot operate. A voltage of 0 volts would be present as the actual value at the input 38 of the operational amplifier circuit n, so that the operational amplifier circuit 35 regulates the output driver 31 such that this generates an ever higher voltage at the regulator output 2. Since the voltage monitoring circuit 39 also needs as its input signal the voltage present at the regulator output 2, this too cannot prevent the voltage increase as a result of the incorrect connection, in which case the malfunction of the load described above can result.

SUMMARY OF THE INVENTION

The object of the present invention is therefore to specify a switching regulator of the type described above which reliably prevents a malfunction of the switching regulator with unpredictable effects on a load connected to it.

This object is achieved by a switching regulator with the features of claim 1. Advantageous embodiments are produced by the dependent claims.

In accordance with the invention the switching regulator features a monitoring means to which the driver circuit applies a voltage signal available via the reference voltage depending on the voltage signal present at the first terminal. In other words this means that the monitoring means is in a position to apply a changed regulation signal to the driver circuit while bypassing the internal voltage divider, which, because of its voltage value, leads directly to a switching off of the regulator. However this no longer guarantees the function of the load connected to the switching regulator. The fact that the function is no longer available can be signaled to a load. However an uncontrolled behavior of the load, e.g. an accidental triggering of an airbag, is reliably prevented.

The desired functionality can be implemented in an especially simple manner by the voltage signal present directly at the regulator output being fed to the driver circuit as a new regulating variable.

In accordance with a preferred embodiment a controllable switchover means is provided which is set up to enable it to feed to the driver circuit either the output signal of the internal voltage divider or a signal present at a second terminal of the circuit arrangement. The second terminal is connected In accordance with the preferred embodiment directly to the regulator output, so that in the case of an interruption it can feed to the first terminal of the driver circuit the signal present at the regulator output.

In a further preferred embodiment the monitoring means features a comparison means to which the voltages present at the first and second terminals can be fed as input variables. In the simplest case the monitoring means can be a comparator circuit.

It is further advantageous for the output signal of the comparison means to be used as a control signal for the switchover means. This causes an automatic switchover in the case of a voltage interruption at the first terminal.

It is further preferred for the switchover means to be able to be controlled by the independent signal present at the regulator output, so that a signal present at the second terminal of the circuit arrangement is fed to the driver circuit. This advantageously enables an external voltage divider to be applied to the inventive circuit arrangement, to enable a more flexible reaction to requirements to be provided as regards the rated voltage to be set.

In this case it is preferred if the voltage monitoring circuit features a logical gate which logically links together the output signal delivered by the comparison means and the control signal.

In a further advantageous embodiment the driver circuit features an operational amplifier circuit and an output driver for controlling a step-down converter, with a voltage monitoring circuit being connected between its node point and the first terminal.

BRIEF DESCRIPTION OF THE DRAWINGS

The invention and its benefits will be explained in more detail below with reference to the Figures. The figures show.

In the Figures the same elements are identified by the same reference symbols.

DESCRIPTION OF THE PREFERRED EMBODIMENTS

Figure 1:
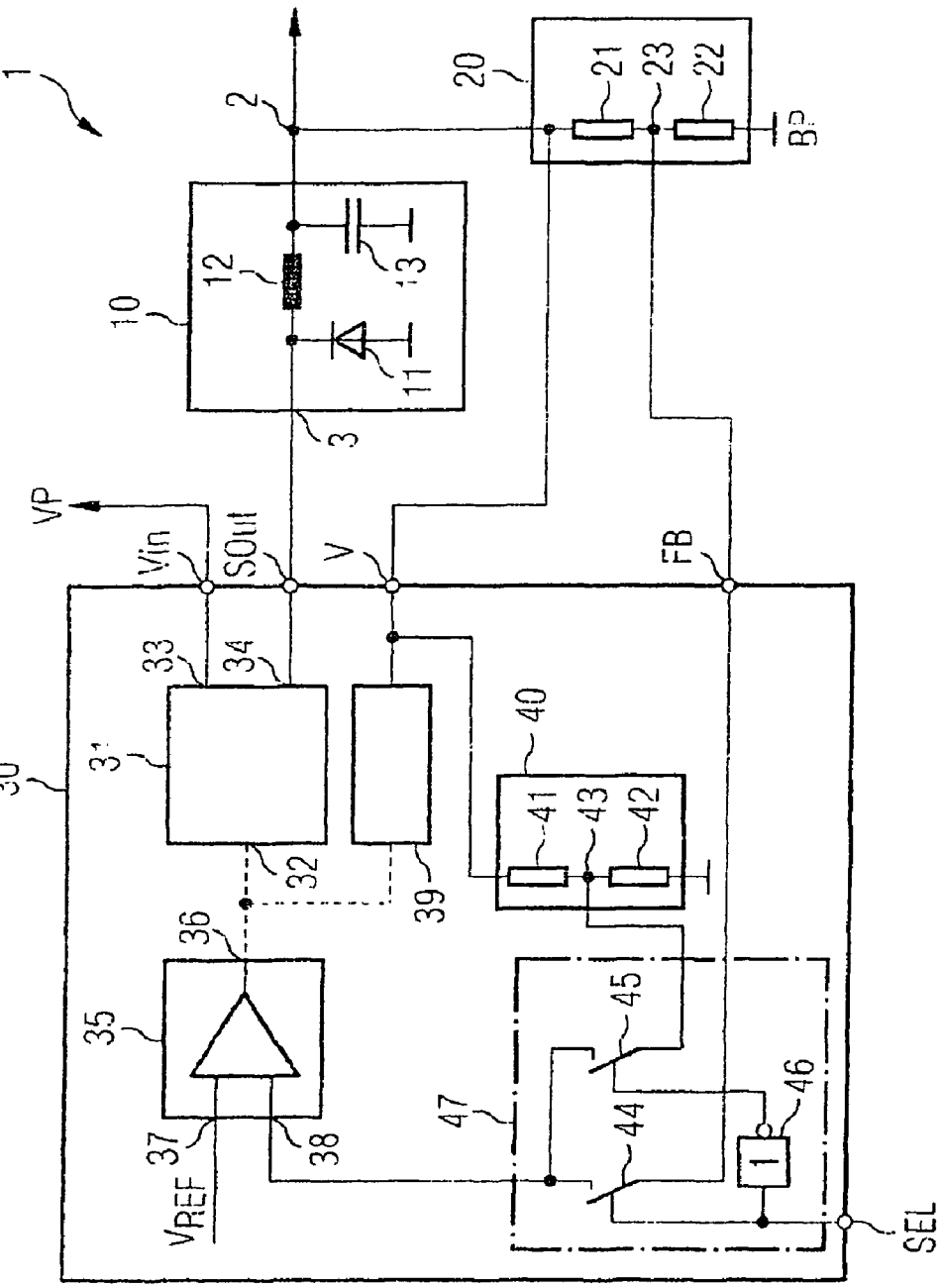
FIG. 1 a switching regulator known from the prior art and already described in the introduction, and FIG. 2 a switching regulator embodied in accordance with the invention.
Figure 2:
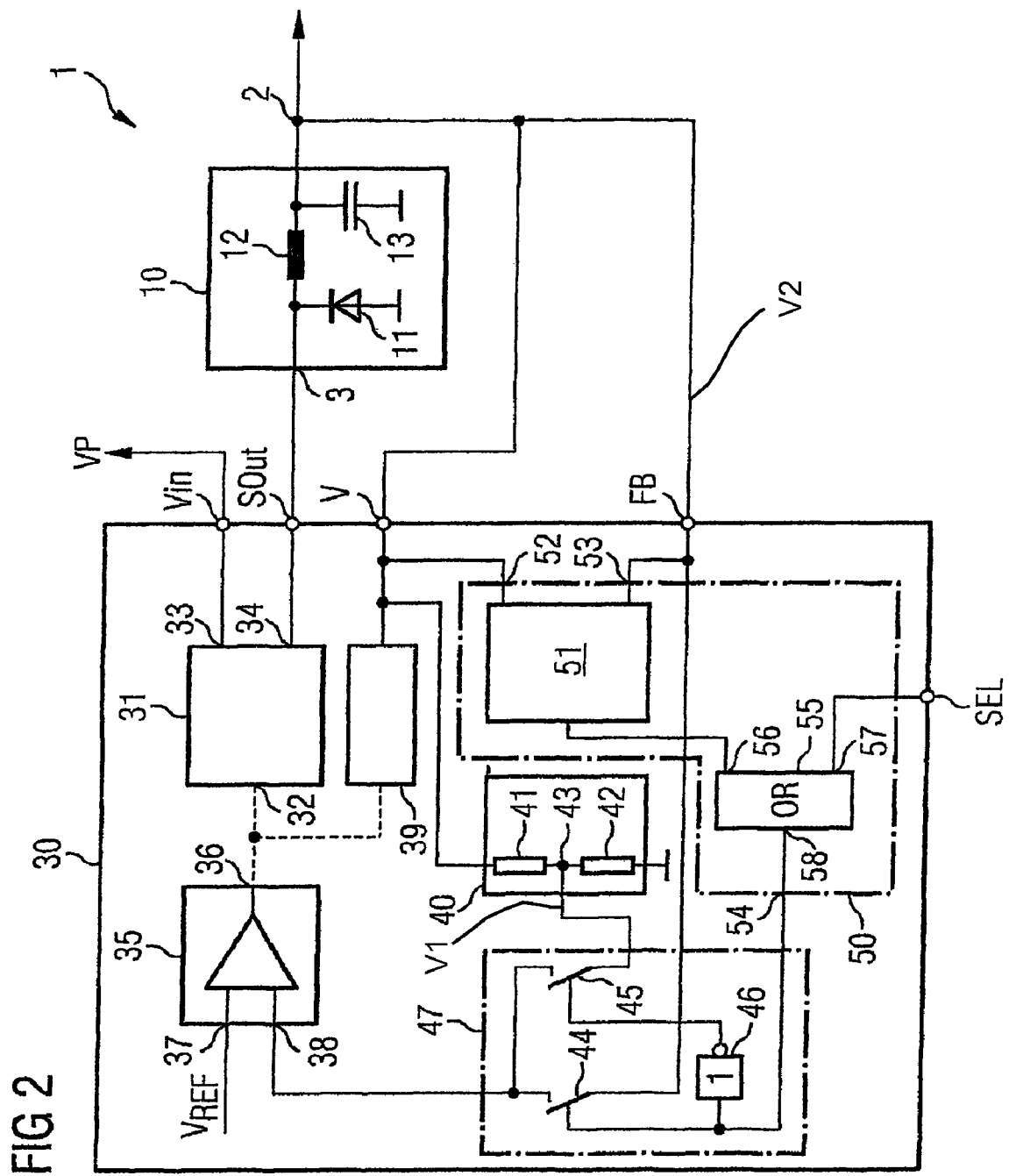

FIG. 2 shows the circuit arrangement 30 of an inventive switching regulator 1 modified compared to the prior art. The functioning and the layout of the switching regulator 1 and especially of the circuit arrangement 30 correspond to the prior art embodiment described in connection with FIG. 1. A further detailed description and explanation of the functions is therefore dispensed with at this point.

In addition to the components also present in the generic circuit arrangement the inventive circuit arrangement 30 features a monitoring means 50. This is connected by its output 54 to the switchover means 47. The monitoring means 50 has two inputs 52, 53, of which the input 52 is connected to the first terminal V and the second input 53 to the second terminal FB. The second terminal FB has a direct connection to the regulator output 2 of the switching regulator 1. The further terminal SEL which is available, which is also present in the generic circuit arrangement in FIG. 1 is connected in the invention to the monitoring means 50.

The monitoring means 50 features a comparison means to which the signals present at the inputs 52, 53 are fed. In the simplest case the comparison means 51 is a comparator circuit. In this case a window comparator or a current balancing system with an MOS diode connected in series can be used. The task of the comparison means 51 is to check whether a higher voltage is present at the second terminal FB than at the first terminal V. If this situation is detected this points to an interruption in the regulation loop passing via the first terminal V. The first regulation loop is formed by the internal voltage divider 40 to which the voltage present at the regulator output 2 is applied.

The switch 45 of the switchover means 47 is closed in normal operation, so that the regulation loop will be formed by the internal voltage divider 40, which provides a signal serving as a first regulation variable v1 at the center tap 43. The detection of a voltage interruption at the first input V leads to an output signal of the comparison means 51 which is fed to an OR gate 55. The OR gate 55 is connected on its output side (output 58) to the output 54 of the monitoring means. A signal present at the output 54 leads to the switchover means 47 causing a switchover of the interrupted internal regulation loop (via the first terminal V) to a further regulation loop which is made via the second terminal FB. In other words the switch 44 of the switchover means 47 is closed while the switch 45 of the switchover means 47 is opened. In this way the voltage signal of the regulator output 2 present at the second terminal FB can be fed directly to the input 38 of the operational amplifier circuit 35 as a new regulating variable v2. An uncontrolled regulation of the operational amplifier circuit 35 and thereby a continuous voltage increase at the regulator output 2 can be prevented in this way, in which case a defined input signal, namely the voltage at the regulator output, is applied to the input 38 of the operational amplifier circuit 35. Since this voltage signal is greater than the reference voltage Vref fed to the operational amplifier circuit 35 an immediate switchover of the switching regulator is effected.

It is also further possible to drive the inventive circuit arrangement 30 in the manner described in FIG. 1. The external voltage divider is connected in the manner shown in FIG. 1, so that its center tap is connected to the second terminal. By application of a control signal to the terminal SEL the switchover means 47 is made to deactivate the internal control circuit through the internal voltage divider 40 by opening the switch 45 and to activate the external control circuit with the external voltage divider by closing the switch 44.

The second terminal FB is thus used to connect a redundant feedback signal, in which case through the comparison of the voltage at the first terminal V and the second terminal FB a criterion is created which determines an interruption of the internal regulation loop, as a rule a pin fracture in the connection of the ASIC with a circuit board. When such a pin fracture is detected the output voltage of the regulator output is fed to the operational amplifier circuit, in which case a comparatively high voltage is present at this circuit and the regulator switches itself off.

This could for example be signaled to a user by a control light.

A pin fracture at the first terminal V when an external divider or the redundant control loop is used does not present any problem since the operational amplifier circuit is supplied via a voltage present at second terminal FB, which makes correct regulation possible.

The comparator circuit used in the monitoring means can for example be embodied by a diode threshold as a sensor.

We claim:

1. A switching regulator configuration (1) functioning as a fixed voltage regulator, comprising:
   a regulator output (2) outputting a voltage signal;
   a terminal (V) connected to said regulator output (2) and receiving the voltage signal;
   a voltage divider (40) coupled to said terminal (V) and receiving the voltage signal, said voltage divider (40) outputting an output signal functioning as a first regulation variable (v1);
   a driver circuit (35,31) coupled to said voltage divider and receiving the first regulation variable, the driver circuit evaluating the first regulation variable with a reference voltage(vref); and
   a monitoring circuit (50) coupled to said driver circuit (35,31), said monitoring circuit (50) applying to said driver circuit (35,31), in dependence on the voltage signal present at said terminal (V), a further voltage signal exceeding the reference voltage (vref) and functioning as a second regulation variable (v2).

2. The switching regulator according to claim 1, wherein the voltage signal present at said regulator output is fed directly as the second regulation variable to said driver circuit.

3. The switching regulator according to claim 1, further comprising:
   a further terminal; and
   a controllable switchover device connected to said driver circuit and set up to be able to feed to said driver circuit either the output signal of said voltage divider or a signal present at said further terminal.

4. The switching regulator according to claim 3, wherein the voltage signal present at said regulator output is present at said further terminal.

5. The switching regulator according to claim 4, wherein said monitoring circuit has a comparison device to which the voltages present at said terminal and said further terminal are fed as input variables to said comparison device.

6. The switching regulator according to claim 5, wherein said comparison device generates an output signal received by and used as a control signal in said controllable switchover device.

7. The switching regulator according to claim 4, wherein said controllable switchover device can be controlled by the voltage signal present at said regulator output, and that a signal present at said further terminal is fed to said driver circuit.

8. The switching regulator according to claim 6, wherein said monitoring circuit has a logical gate which logically combines the output signal output by said comparison device and a further control signal.

9. The switching regulator according to claim 1, wherein said driver circuit has an operational amplifier circuit and an output driver to control a step-down converter, said operational amplifier circuit connected to said output driver via a node point, said monitoring circuit connected between said node point and said terminal.

\* \* \* \* \*